(12) United States Patent
Maraschi-Schouschtari et al.

(10) Patent No.: US 8,311,995 B1
(45) Date of Patent: Nov. 13, 2012

(54) INSTALLATION-FREE GENERIC SERVICE-ORIENTED ARCHITECTURE (SOA) ASSET IMPORTER, AND/OR ASSOCIATED SYSTEMS AND/OR METHODS

(75) Inventors: Seyed Mohammad Ali Maraschi-Schouschtari, Darmstadt (DE); Harald Schöning, Dieburg (DE)

(73) Assignee: Software AG, Darmstadt (DE)

( * ) Notice: Subject to any disclaimer, the term of this patent is extended or adjusted under 35 U.S.C. 154(b) by 0 days.

(21) Appl. No.: 13/234,266

(22) Filed: Sep. 16, 2011

(51) Int. Cl.
*G06F 17/30* (2006.01)
(52) U.S. Cl. ....................................... 707/694
(58) Field of Classification Search ............. 707/694
See application file for complete search history.

(56) References Cited

U.S. PATENT DOCUMENTS 8,196,145 B2 * 6/2012 Miller et al. ............... 718/106
2010/0017783 A1 * 1/2010 Brininstool et al. ........ 717/101

OTHER PUBLICATIONS

HP SOA Systinet. HP Enterprise Software. [retrieved Sep. 15, 2011] http://www8.hp.com/us/en/software/software-product.html?compURI=tcm:245-936884&pageTitle=SOA-Systinet, Copyright Sep. 2010.
HP SOA Systinet Software—Data Sheet. [retrieved Sep. 15, 2011] http://h20195.www2.hp.com/V2/GetPDF.aspx/4AA3-0926ENW.pdf.
Oracle Service Registry. [retrieved Sep. 15, 2011] http://www.oracle.com/technetwork/middleware/registry/overview/index.html.
Oracle Enterprise Repository and Oracle Service Registry for SOA Governance—Data Sheet. http://www.oracle.com/us/technologies/soa/enterprise-repository-svc-reg-ds-066414.pdf [retrieved Sep. 15, 2011], copyright 2008.
IBM—Websphere Service Registry and Repository—Software. [retrieved Sep. 15, 2011] http://www-01.ibm.com/software/integration/wsrr/#.
IBM—Websphere Service Registry and Repository—Features and Benefits. [retrieved Sep. 15, 2011] http://www-01.ibm.com/software/integration/wsrr/features/index.html?S_CMP=wspace.

* cited by examiner

*Primary Examiner* — Cheryl Lewis
(74) *Attorney, Agent, or Firm* — Nixon & Vanderhye PC

(57) ABSTRACT

Certain example embodiments relate to importing assets into a service-oriented architecture (SOA) registry. An SOA system includes a repository for storing a plurality of files relating to real assets, and a registry containing metadata and/or other information about these real assets, including at least one registry asset per real asset. Each registry asset has a registry asset type. A generic import module is configured to (a) receive as input one or more import specifications, with each import specification defining how information from an external specification file of an asset type is to be extracted to create one or more registry assets of one or more corresponding target registry asset types, (b) generate one or more registry assets of one or more target registry asset types based on a corresponding import specification, and (c) register the generated one or more registry assets of the one or more target registry asset types.

25 Claims, 11 Drawing Sheets

INSTALLATION-FREE GENERIC SERVICE-ORIENTED ARCHITECTURE (SOA) ASSET IMPORTER, AND/OR ASSOCIATED SYSTEMS AND/OR METHODS

FIELD OF THE INVENTION

Certain example embodiments described herein relate to techniques for importing assets into a service-oriented architecture (SOA) registry. In certain example embodiments, a generic import module that is added to the SOA registry once will, based on specifications that it takes as input, generate assets of target asset types and register them with the SOA registry.

BACKGROUND AND SUMMARY OF EXAMPLE EMBODIMENTS OF THE INVENTION

As is known, service-oriented architecture (SOA) implementations typically involve SOA registries. FIG. 1 is a schematic view showing sample assets in an SOA registry 101. Typically, the SOA registry 101 will be combined with a repository 102 to faun a combined SOA registry/repository 103. Typically, the registry manages metadata only. The repository typically includes files (e.g., WSDL files, XML schema files, etc.). Registered metadata assets are distinguishable from "real world" objects (e.g., the real assets running the web service, etc.), and the former is identified herein as being "assets (reg.)." Relevant building blocks of the SOA, typically referred to as assets (real), may be registered, optionally together with associated metadata (which is the part of the asset (reg.)). The registering of an asset (real) may result in the creation of an asset (reg.), with there normally being at least one asset (reg.) for each asset (real). Relevant metadata may include, for example, name, description, terms of usage, version, and state in the life cycle, etc. Furthermore, the SOA registry may be configured with policies that control addition, change, and/or usage of SOA assets (real and reg.).

Information regarding the interconnection between SOA assets (real) also may be made available in the SOA registry by registering them as interconnections between assets (reg.). If, for example, a business process P implementation 110 makes use of service S 111, and service S 111 is described by a WSDL file 120 that imports XML schema file X 121 that in turn is described by XML schema X, it would be desirable to make available from the SOA registry at least the following information (which may result in many assets (reg.) belonging to the following and/or other asset types (reg.): business process (type), service (type), XML schema (type)) metadata of business process P 110, metadata of service S 111, the WSDL file W 120 for service S 111, and the XML schema specification X 121, together with metadata on X 112. Furthermore, it would be desirable to make available information indicating that P and S are related to each other (via the uses relationship 130), that W is the WSDL of S (via the described by information 131), and that X is in use by W (via the imports information 132). The SOA registry may then derive that P transitively depends on X.

It will be appreciated that in SOA registries, it is quite common to not only register standard SOA assets (real), but to also extend the preconfigured model by environment specific asset types (reg.). These asset types (reg.) may depend on the associated organization, on standards employed in a certain SOA setting, or other factors. Although it sometimes may be possible to extend the model of a SOA registry, the automated registration of corresponding assets (real) currently requires a considerable amount of custom programming. This custom programming may require a potentially deep understanding of the technical requirements and/or associated system architecture of one or more relevant organizations. In addition, when such a component has been programmed, it is not always easy to share it between multiple installations of a SOA registry. Typically, an installation activity is needed that might even cause a temporary unavailability of the registry. This temporary downtime might come at an inopportune time or may be required in implementations where "continuous uptime" is required.

Indeed, while there typically is a common understanding of SOA principles among companies that implement their IT according to these principles, the specific implementation of an SOA very frequently varies between the implementers, and the principles of governance of such an environment can vary even more. As a consequence, in one company implementing an SOA, a certain type of assets might be of high importance, while in other companies such assets are not even present. Consider, for example, Company A that makes use of the Service Component Architecture (SCA) standard for the management of its software. For this company, the management of SCA composites might be important. Typically, such assets of interest include a whole group of assets of various types. In the SCA example, an SCA composite includes SCA components, services, implementations, wires, etc., that all may need to be reflected when an SCA composite is registered in the SOA registry. By contrast, another Company B might not make use of the SCA standard. In such a situation, SCA composites may be of no value for company B.

As a consequence of these differences in SOA implementations, the producers of SOA registries cannot always foresee all asset types that might be relevant in a certain company's SOA implementation. While there are some asset types that are most probably relevant in all or most SOA implementations (e.g., "Service" asset types), many other asset types might be very organization specific.

To address this issue, SOA registries typically have an open type model, allowing customers to define new asset types. After definition of an asset type (reg.), assets (reg.) of this type typically can be entered via a user interface. However, in many cases, an automatic registration based on a description available in another format would be preferable. For example, for a company dealing with SCA composites, manually typing all details of the SCA composite (that oftentimes include many sub-parts) would be cumbersome. There is, however, an XML file for each composite that contains all basic information about the composite. The SOA registry could read this XML file and derive the necessary information for registration. This process is called "import."

FIG. 2 shows a current approach for implementing a specific import functionality. Currently, someone (and typically the vendor of the SOA registry) will program a dedicated plug-in 202 for each specific import functionality for the SOA registry that reads the external descriptions 201 of the asset type(s) 203 to be imported. For instance, separate dedicated plug-ins 202 may be provided for SCA composites, web applications, database configurations, etc. It is noted that these external descriptions 201 may include several files. The plug-ins 202, in turn, may register the corresponding assets 204, and optionally store corresponding files 205 in the SOA repository. The programmer may then provide the plug-in(s) to the operator of the SOA registry. It will be appreciated that different specific import functionality implementations may generate assets of the same asset type, e.g., as shown in FIG. 2.

The operator of the SOA registry typically has to install the plug-in(s), which typically requires at least a restart of the registry, and very often also requires access rights on the server where the SOA registry is installed. The access rights needed are often those of an administrator of the server, which is typically different from the administrator of the SOA registry. When the asset type's (reg.) data model or the external format describing the asset change, the SOA registry vendor most likely has to change the relevant plug-in(s) and provide it/them anew to the operator. Once a certain import functionality is installed, it typically is usable by all users. However, it is believed that there are no techniques for restricting import of a specific kind of assets to certain users in current solutions.

Thus, it will be appreciated by those skilled in the art that there is a need in the art for techniques that address one of more of the above-described and/or other issues.

One aspect of certain example embodiments of this invention relates to using the registry's own mechanisms to introduce new importing capabilities.

Another aspect of certain example embodiments of this invention relates to making it easier to adapt the import functionality to changes in the source assets or in the registry's model.

Another aspect of certain example embodiments of this invention relates to restricting the example importing techniques so that they are made available for certain users only. Such restrictions can be put in place specifically for a certain import functionality in certain example embodiments. In addition, or in the alternative, the modification and creation of import functionality can be restricted to certain users.

Still another aspect of certain example embodiments of this invention relates to modeling the import specifications as assets (reg.) that are stored in the SOA registry itself and interpreted by a generic import module a definition regarding how to retrieve information from external specification file(s).

In certain example embodiments, a computer system includes processing resources including at least one processor and at least one memory. At least one non-transitory computer readable storage medium is accessible by the processing resources and includes: a repository configured to store a plurality of files relating to assets (real), and a registry containing metadata and other information about these assets (real), including at least one asset (reg.) per asset (real) and with each asset (reg.) having an asset type (reg.). A generic import module is configured to (a) receive as input one or more import specifications, with each said import specification defining how information from an external specification file of an asset type is to be extracted to create one or more assets (reg.) of one or more corresponding target asset types (reg.), (b) generate one or more assets (reg.) of one or more target asset types (reg.) based on a corresponding import specification, and (c) register, in the registry, the generated one or more assets (reg.) of the one or more target asset types (reg.).

In certain example embodiments, there is provided a method of importing assets (reg.) having one or more source asset types (reg.) together with relevant documents (e.g., files) into a service-oriented architecture (SOA) registry and/or repository. The SOA repository and the SOA registry are stored in a non-transitory computer readable storage medium of an SOA computer system comprising at least one computer having at least one processor in operable communication with the SOA repository and the SOA registry. A generic import module is invoked, via the at least one processor, in response to input identifying an import functionality and the target SOA registry, and either (a) input specifying one or more external specification files describing the one or more assets to be registered, or (b) an automatic derivation of the one or more external specification files describing the one or more assets to be registered based on a relationship between the one or more external specification files and the identified import functionality. One or more import specifications is/are retrieved. An extraction algorithm specified by the one or more retrieved import specifications is run on the external specification files to be registered to create one or more target assets (reg.) having one or more target asset types (reg.). The one or more target assets (reg.) having one or more target asset types (reg.) are stored or registered in the SOA registry.

Non-transitory computer readable storage mediums tangibly storing instructions for performing the above-summarized and/or other methods also are provided by certain example embodiments, as well as corresponding computer programs.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 5a-5f illustrate a sample asset (reg.) of asset type (reg.) as it would be specified via an example user interface in communication with an SOA registry in accordance with certain example embodiments; and FIG. 6 is an example screenshot demonstrating a drop-down list enabling a user to specify how an asset is to be imported in accordance with certain example embodiments.

DETAILED DESCRIPTION OF EXAMPLE EMBODIMENTS OF THE INVENTION

Certain example embodiments enable SOA operators themselves to create the functionality to import assets of specific asset types. The resulting import functionality may be added to and/or removed from the system without interruption of the system. The right to create such an import functionality may be granted based on organizational roles in certain implementations, and can even be made dependent on the type of the assets to be created by the import functionality. Thus, in certain example implementations, permissions may be defined in a much more fine-grained manner than in current approaches. The resulting import functionality may be easily transferred to another instance of the SOA registry to enable the same import functionality there. In case of changes in the external asset description's structure or in the asset type's (reg.) definition in the SOA registry, the import functionality may easily be adapted by the operator (e.g., via the SOA registry's user interface). In the latter case, the SOA registry may even derive the need for such an adaption itself (e.g., using a design time policy), whereas customer using currently available tools would not necessarily know of the need for a change before trying the import. The newly defined import functionality may be made accessible via a user interface of the operator.

Figure 1:
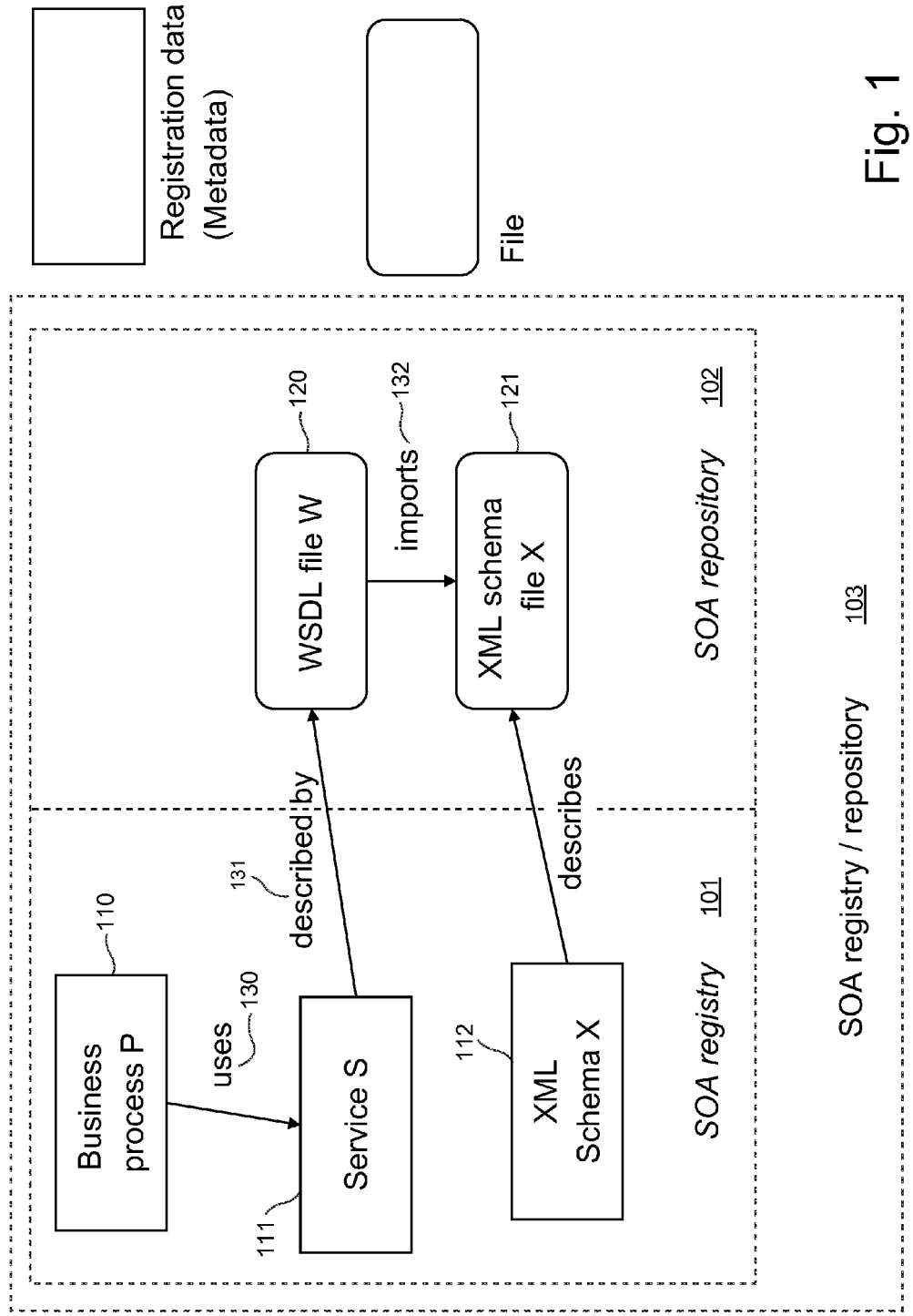
FIG. 1 is a schematic view showing sample assets (reg.) in an SOA registry.
Figure 2:
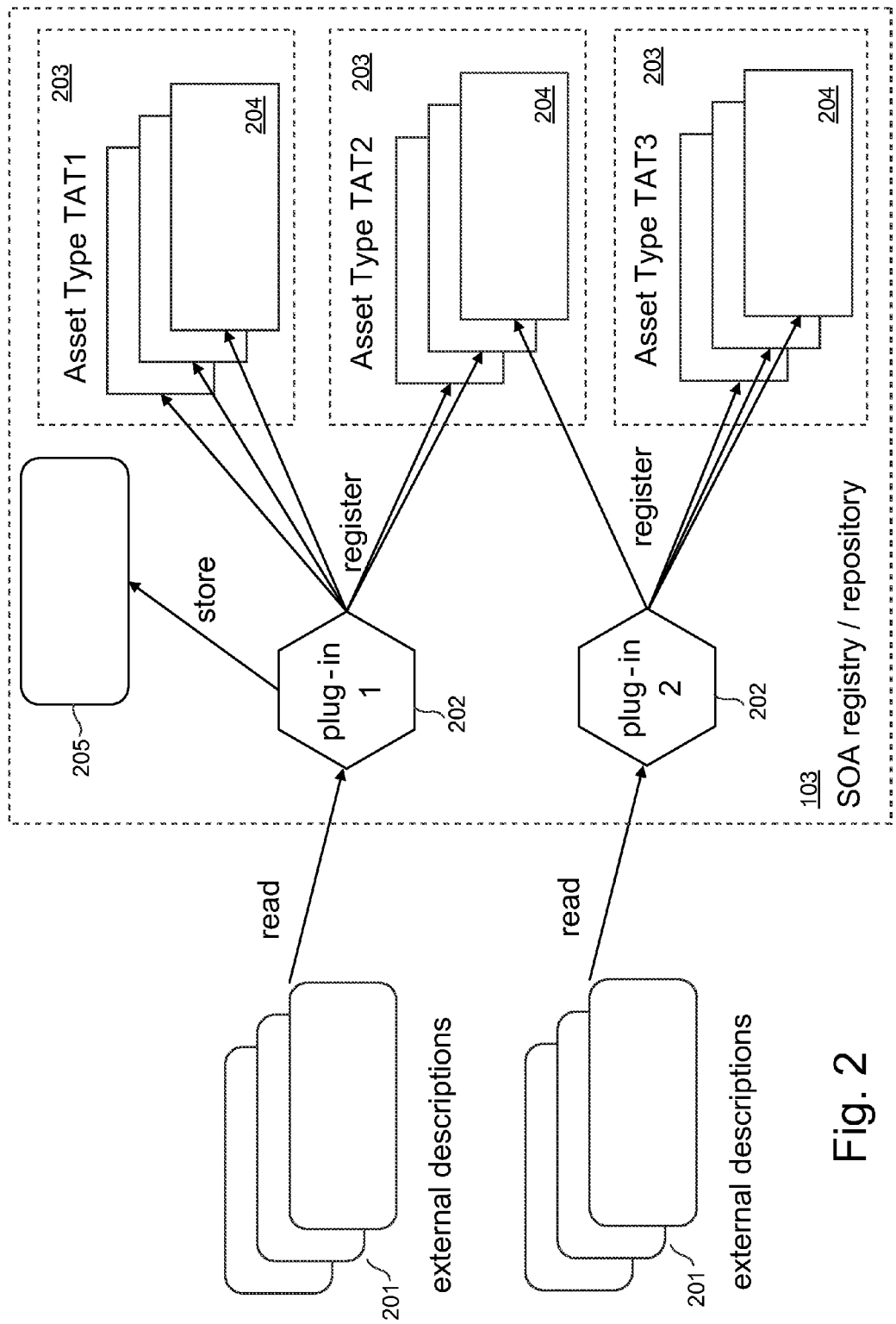
FIG. 2 shows a current approach for implementing a specific import functionality.
Figure 3:
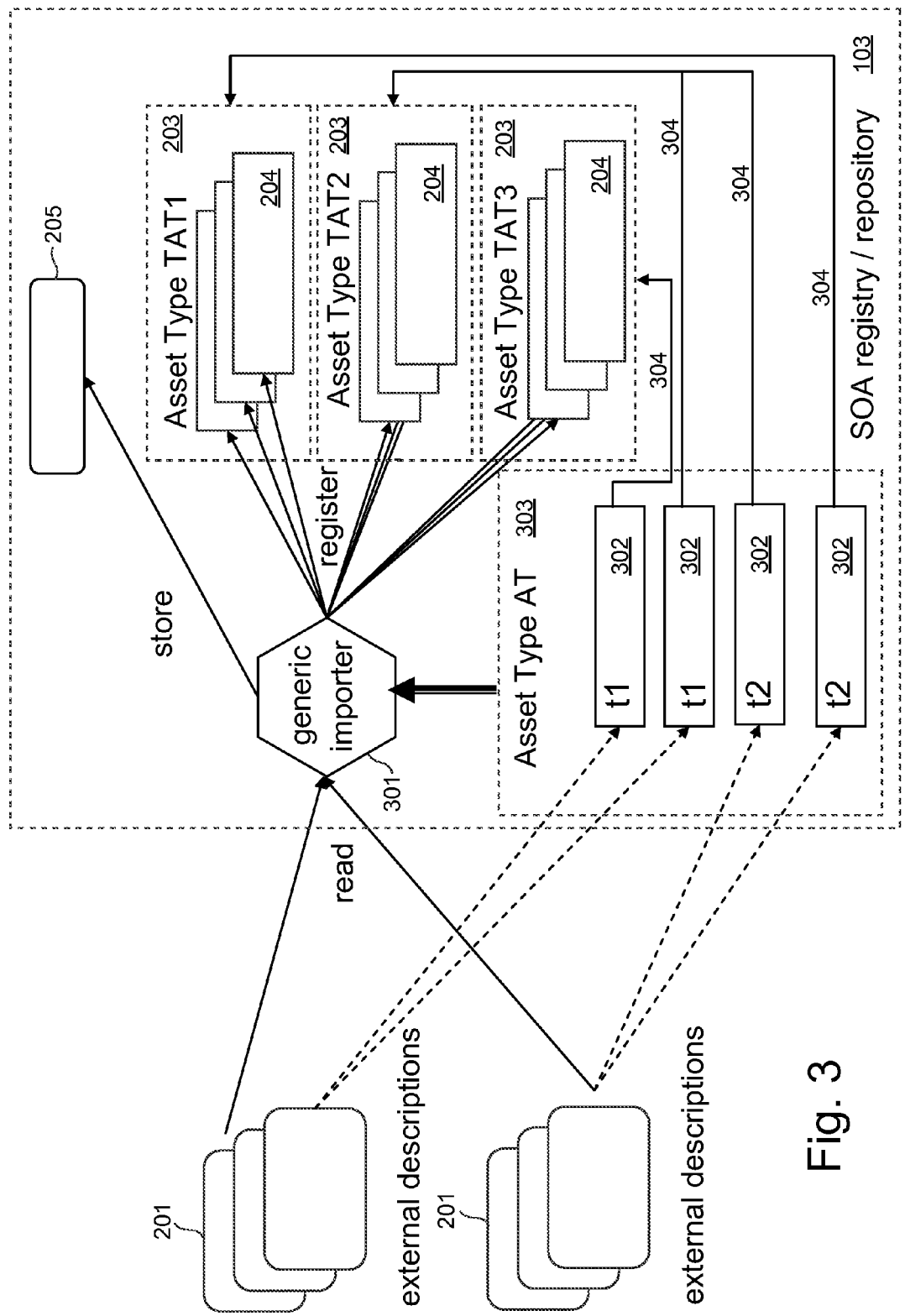
FIG. 3 is an illustrative import architecture according to certain example embodiments.

FIG. 3 is an illustrative import architecture according to certain example embodiments. The illustrative import architecture of FIG. 3 includes a generic import module 301 that is added to the SOA registry once (e.g., by the vendor even before the registry is delivered to a customer), and that will, based on specifications 302 that it takes as input, generate assets (reg.) 204 of the target asset types (reg.) 203 and register them.

To enable installation-free exchange of specific import functionality for a certain set of asset types (reg.) (e.g., mapping an external specification file), the definition of how to retrieve information from the external specification file(s) may be modeled as assets (reg.) 302 that are stored in the SOA registry itself and interpreted by the generic import module 301. Thus, the import specification in certain example embodiments may be transferred from one SOA registry to another with the standard asset (reg.) exchange mechanism (e.g., by exporting the corresponding assets (reg.) as an archive from the source registry and importing them in the target registry). There may in certain example instances be several distinct import functionality specifications, e.g., one for SCA composites, one for web applications, one for database configurations, etc. To distinguish between the corresponding assets (reg.), each asset (reg.) may be tagged or classified with a tag or category, e.g., using standard SOA registry functionality. Tags t1 and t2 shown in FIG. 3 uniquely identify the corresponding import functionality.

A dedicated asset type (reg.) AT 303 is introduced to store the assets (reg.) interpreted by generic import module. As mentioned above, a specific import functionality may in certain example embodiments create many assets (reg.) of several asset types (reg.) from the set of external specification files. For each of these target asset types (reg.) TAT, an asset (reg.) 302 of asset type (reg.) AT 303 is created to describe how the information from the external specification files 201 is to be extracted to create assets (reg.) of type TAT. For instance, in FIG. 3, arrows 304 show the relationship of these assets (reg.) 302 to the asset types (reg.) 203. This may be done, for example, by specifying the source of information for each attribute of a TAT separately in certain example implementations. Depending on the type of attribute, several aspects may be specified:

- For attributes that express a relation to another asset (reg.) of the same or a different asset type (reg.), the target asset's (reg.) identification may be specified, as well as attributes of the relation (e.g., type of the relation). Examples of such "relationship attribute rules" are discussed in greater detail below.
- For attributes that represent files in a repository associated with the SOA registry, a path to the file may be specified, as well as the location where the file is to be stored in the repository. Examples of such "file attribute rules" are discussed in greater detail below.
- For attributes that represent a classification with a certain taxonomy, the taxonomy and the corresponding category may be specified. Examples of such "classification attribute rules" are discussed in greater detail below.
- For all other attribute types, the values may be specified. For instance, for single-valued attributes, one value may be specified, where multiple values can be specified for multi-valued attributes. Examples of such "slot attribute rules" are discussed in greater detail below.

The specification of information discussed above may be done by providing constants, by specifying an algorithm to extract values and/or the like from the external specification files, or by some other technique. For instance, in a simple case when there is a single external specification file in XML format, an extraction algorithm may include a simple XPath expression. As another example, in a more complex case, the extraction algorithm may include an XQuery expression. The importer of certain example embodiments may accept multiple formats for the specification of the extraction algorithm. It will be appreciated that specifications other than those provided in XML may be supported in different embodiments of this invention.

Each asset (reg.) of asset type (reg.) AT may include some or all of the following and/or other information:

- The target asset type (reg.) TAT;
- A tag t specifying the specific import functionality it belongs to;
- An optional list of tuples of relationship attributes of the target asset type (reg.) TAT, the corresponding extraction algorithms for the target assets (reg.), and additional attributes of the relationship to be set together with the extraction algorithms to derive the values;
- An optional list of links between (e.g., pairs of) file attributes and the extraction algorithms for the paths of the files they should point to;
- An optional list of triples of classification attributes, and extraction algorithm(s) for taxonomy and category; and/or
- An optional list of links between (e.g., pairs of) other attributes and the extraction algorithm(s) for the values to be set.

In certain example embodiments, this information may be stored in a record that may, in turn, be stored in a non-transitory storage medium.

Assets (reg.) of asset type (reg.) AT may be added to the SOA registry in several ways including, for example, by entering the information via a user interface, by programmatically specifying them via an application programming interface (API) of the SOA registry, by importing them (e.g., when they have been exported from a SOA registry before, to transfer them form one SOA registry to another), or via any other suitable technique. Moreover, such assets (reg.) may be created automatically, e.g., when a change in format is detected by at least one processor in communication with the SOA registry.

In connection with the entering of assets (reg.) of asset type (reg.) AT via a user interface and the programmatic specification via an API or any other input method, there may be a control for the correctness of the specifications. For instance, in certain example embodiments, it may be possible to instruct at least one processor or verifying logic executable thereby to check that the target asset type (reg.) TAT exists, that the attributes specified exist, that all attributes marked as required for the asset type (reg.) TAT are specified in the import specification, that attribute types match the types returned by the extraction algorithms, etc. Unmapped, required, or optional attributes may also be flagged. In order to automate these checks, one or more policies may be defined to check all of the relevant conditions and/or to reject an import specification if it violates the rules defined in the policies. It is noted that the policies may flag suspect or improper imports for manual follow-up in certain implementations. The use of policies may be advantageous in certain example instances, as policy enforcement regimes typically are available in SOA registries.

It will be appreciated that policies may be predefined at least in part by the vendor of the SOA registry. Policies may be customized or enhanced by the operator/administrator of the SOA registry or other qualified personnel, e.g., to better reflect the specific context. The policies may also be transferred to another SOA registry in certain example implementations, e.g., by exporting them from their origin registry and importing them to the target registry.

The task of specifying the assets (reg.) of asset type (reg.) AT may be further simplified in certain example embodiments by using another policy to partially generate the lists or linkages specified above, e.g., when an asset (reg.) of asset type (reg.) AT is created and a target asset type (reg.) TAT is specified.

Figure 4:
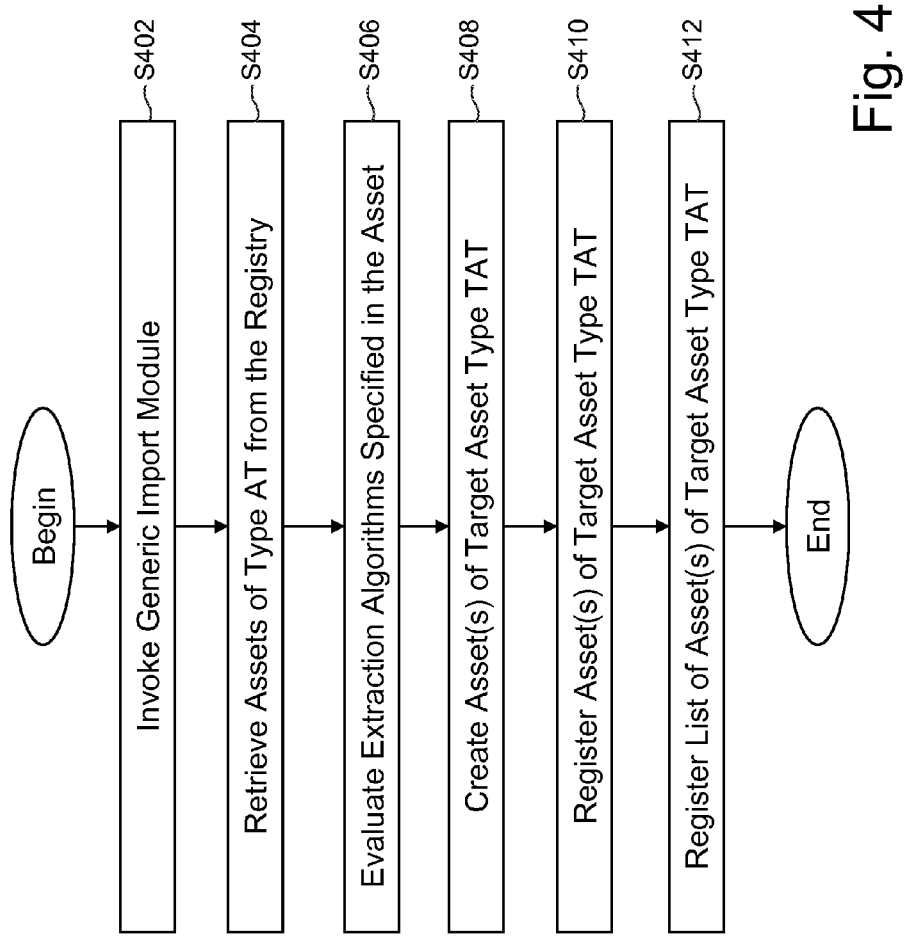
FIG. 4 is a flowchart demonstrating an illustrative process for invoking a generic importer in accordance with certain example embodiments.

FIG. 4 is a flowchart demonstrating an illustrative process for invoking a generic importer in accordance with certain example embodiments. The generic import module of certain example embodiments may be invoked (step S402) by specifying the specific import functionality addressed (e.g., by virtue of its tag), the target SOA registry, and the external specification file(s) describing the assets to be registered. The specific import functionality may also be derived from the type of the external specification file(s), e.g., if there is an unambiguous relationship between type of specification files and related import functionality, or if there is a way of sufficiently disambiguating multiple potential matches. The generic importer may retrieve the assets (reg.) of asset type (reg.) AT from the registry (step S404), considering only those with the tag corresponding to the specific import functionality addressed. It then may process these assets (reg.) one-by-one or in batch. Based on the specifications in this asset (reg.) of asset type (reg.) AT, it may evaluate the extraction algorithms specified in this asset (reg.) (step S406), and create one or more assets (reg.) of the target asset type (reg.) TAT (step S408), depending on the result of the application of the extraction algorithms to the external specification files. These target assets type (reg.) assets may be registered (step S410). Moreover, in certain example instances, as a result of a single invocation of the generic importer, multiple assets (reg.) of multiple target asset types (reg.) may be registered in certain example instances. The generic importer may create a list of all these assets (reg.) and register this list in the SOA registry as well (step S412), potentially allowing for removal of all these assets (reg.) at a time, e.g., by a deletion policy. In certain example embodiments, it may be possible to handle the import in an atomic fashion. For instance, all assets (reg.) may be registered, or none may be registered.

By restricting read access to the asset type (reg.) AT or to specific assets (reg.) of this type, the usage of the import functionality may be restricted to certain users in certain example implementations. By restricting the write access on the asset type (reg.) AT to certain users, the right to define new specific import functionality may be restricted to certain users.

As discussed above, the specifications of a specific import functionality may be easily transferred to another SOA registry, for example, by exporting the assets (reg.) of asset type (reg.) AT, either all at once, only those having a specific tag (e.g., representing a specific import functionality, by manually selecting one or more types, etc.). Export functionality may be provided by an export module which may be, for example, a component present in or functionality of a registry and/or repository. Such an export module may be used to export dedicated sets of assets (real and/or reg.) depending, for example, upon where it is located.

When the type definition of a target asset type (reg.) TAT is modified, policies may be used to check whether there are assets (reg.) $at_{AT}$ of asset type (reg.) AT that specify import functionality that is affected by the modification of TAT (e.g., because an attribute specified in $at_{AT}$ is no longer present, because an attribute not specified in $at_{AT}$ is declared as required, etc.). The policies may be used either to reject the modification of TAT, to automatically accept such modifications, to alert an administrator to make him aware of the need for an adaptation of $at_{AT}$, to automatically adapt $at_{AT}$, etc.

FIGS. 5a-5f illustrate a sample asset (reg.) of asset type (reg.) AT as it would be specified via an example user interface in communication with an SOA registry in accordance with certain example embodiments. For instance, in FIG. 5a, an asset (reg.) of asset type (reg.) AT (called EFFI type here) named "SCAComposite" is shown, which describes how assets of type SCAComposite are being imported. As indicated in the general information pane, this asset is tagged with "Import>SCA," and so it belongs to the SCA import functionality. Information regarding the target asset may be entered in the FIG. 5b example screen. Such information may include, for example, the target asset type (reg.), target asset (reg.) source, and target asset (reg.) name. Absolute or relative values may be provided in different implementations. Slot attribute rules (such as, for example, slot attribute name, slot attribute type, and slot attribute source) may be provided via the FIG. 5c example screen.

Figure 5A:
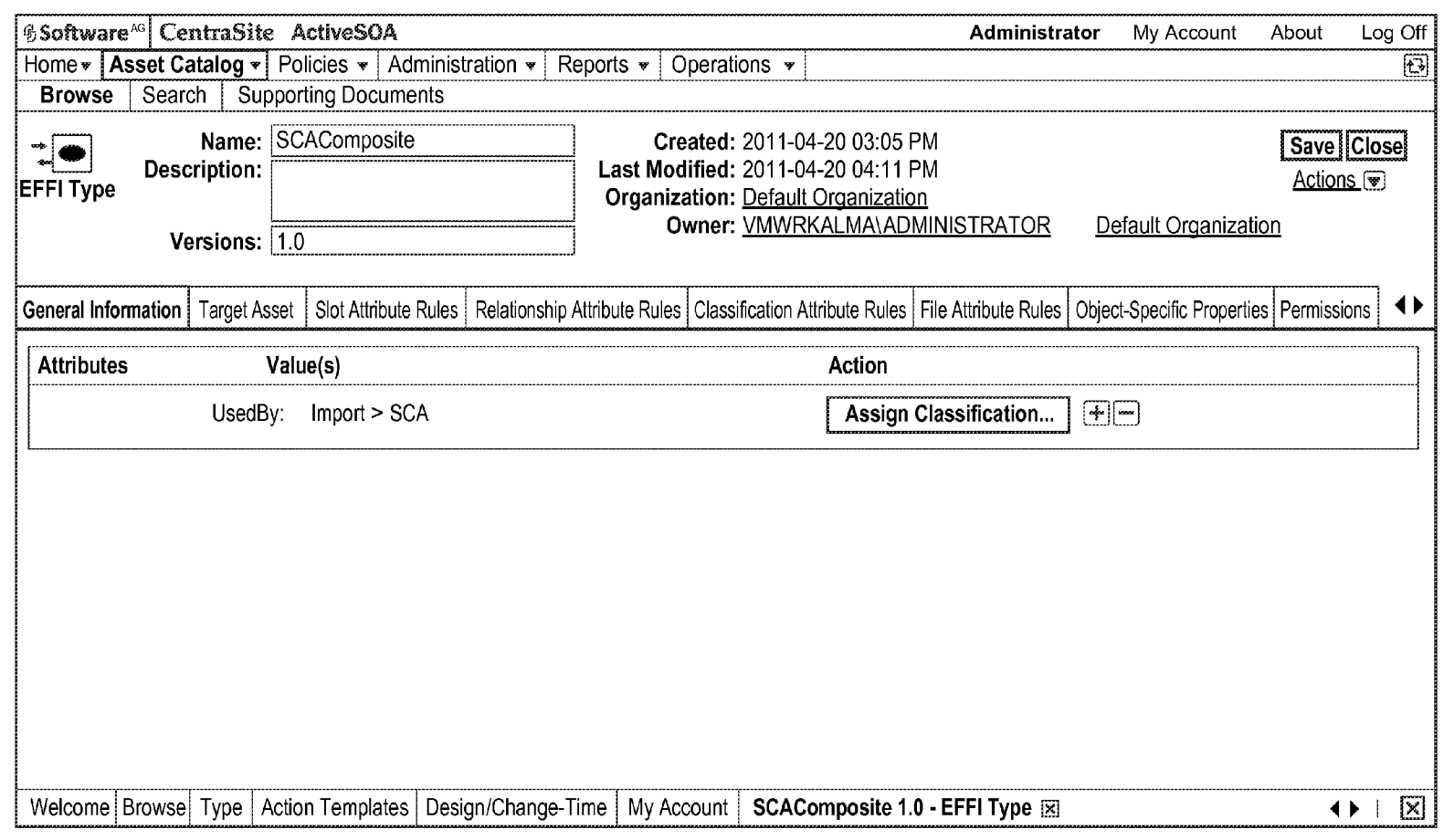
Figure 5B:
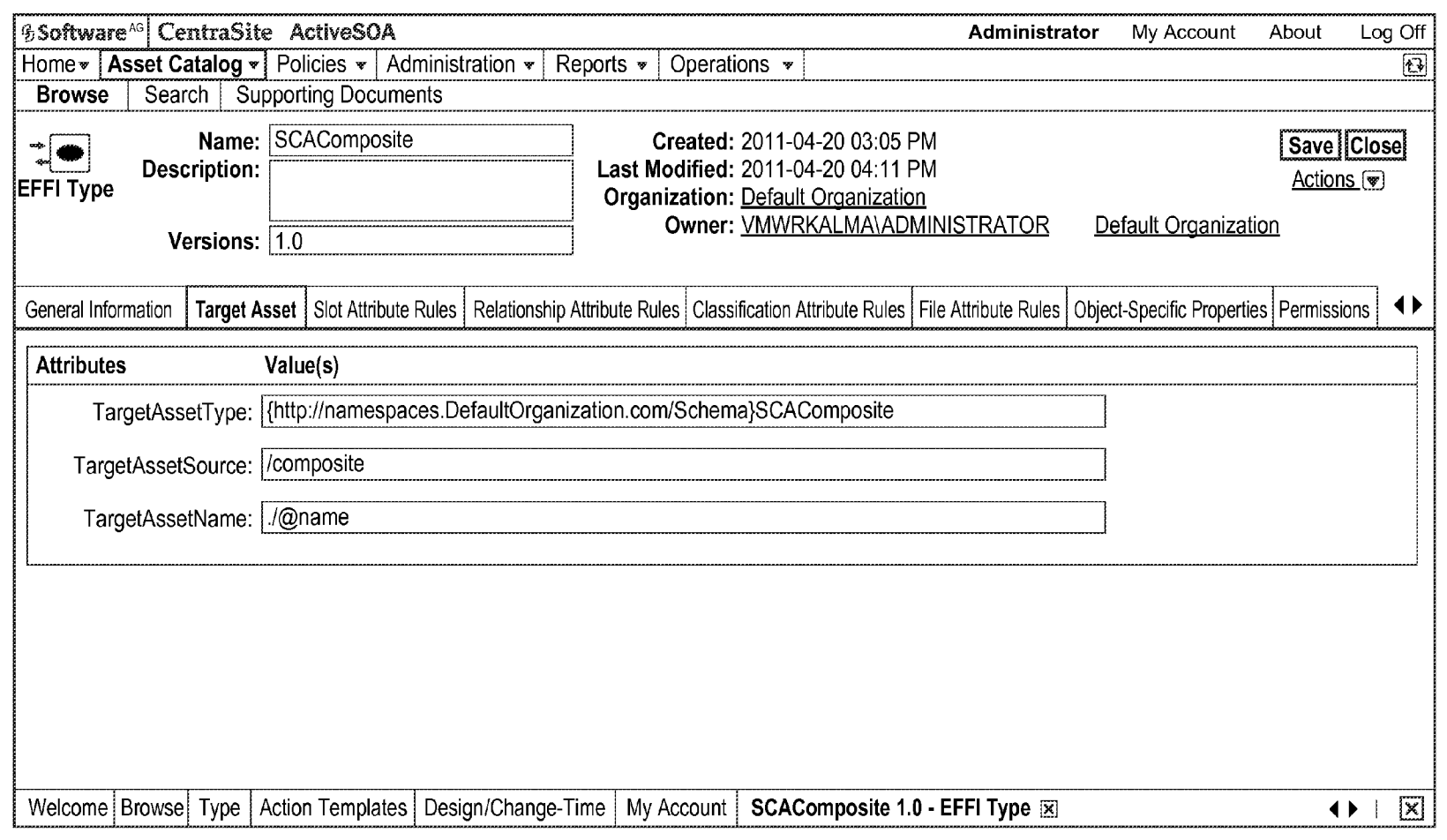
Figure 5C:
Figure 5D:
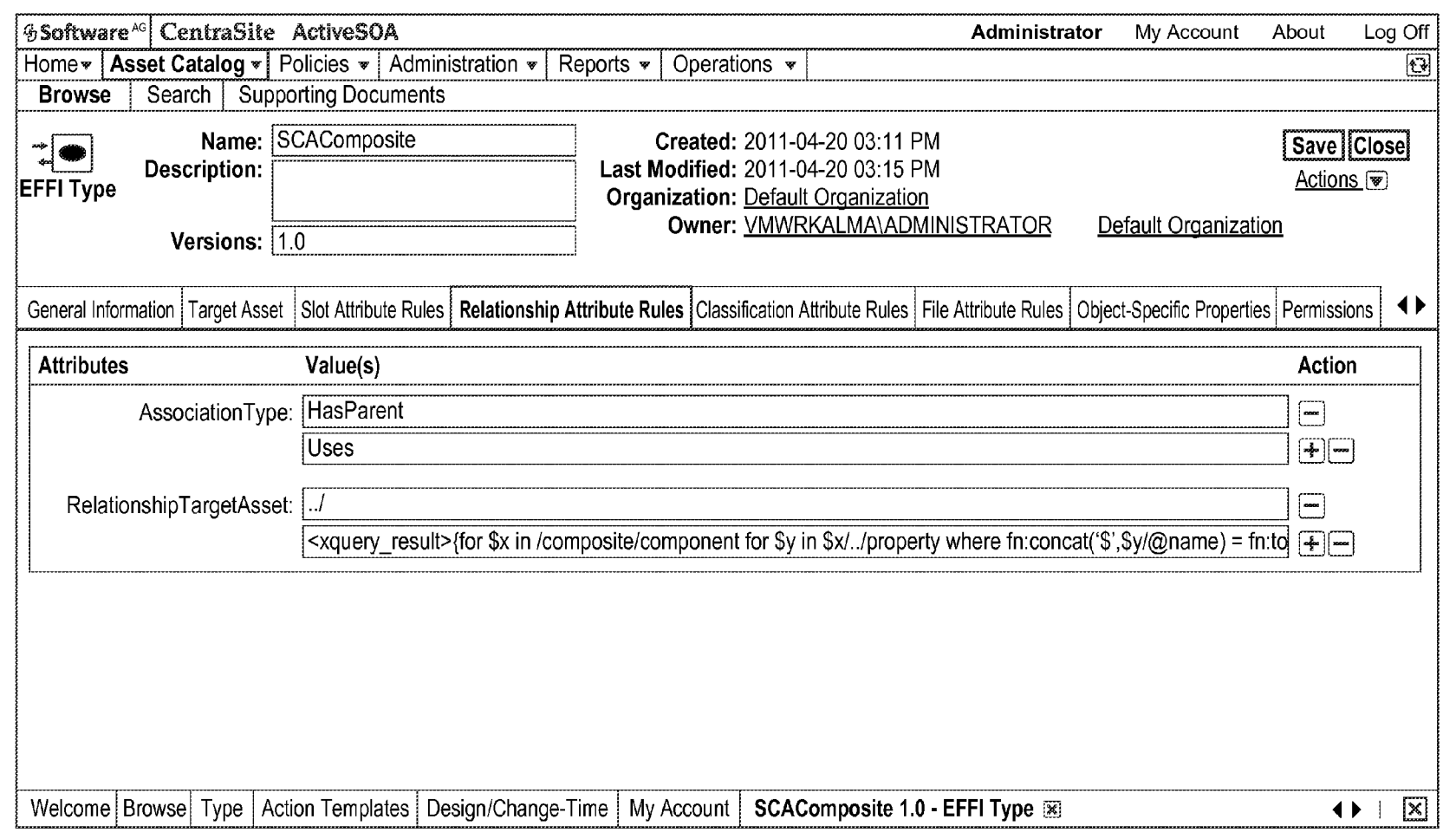
Figure 5E:
Figure 5F:

Relationship attribute rules may be defined via the FIG. 5d example screen. Relationships such as, for example, has parent, has child, uses, extends, is defined by, etc., may be specified. Similarly, target assets for such relationships may be specified, e.g., in terms of XPaths, XQueries, etc. In FIG. 5e, classification attribute rules may be specified. For instance, values may be given for a classification attribute, classification taxonomy, and classification category. Similarly, in FIG. 5f, file attribute rules may be specified. For instance, values may be given for the file attribute's name, related file name, file source path, and file repository URL.

The generic import module of certain example embodiments may be integrated within or in communication with the SOA registry. In certain example embodiments, the generic import module may be invoked both via an API of the SOA registry, via the user interface of the SOA registry, or via some other technique. The invoking via the user interface of the SOA registry implies that in some example embodiments, all specific import functionalities may automatically manifest themselves in the user interface of the SOA registry, e.g., by one entry per tag T in a drop down box. An example drop-down box is shown in connection with FIG. 6. That is, FIG. 6 is an example screenshot demonstrating a drop-down list enabling a user to specify how an asset is to be imported in accordance with certain example embodiments.

Figure 6:
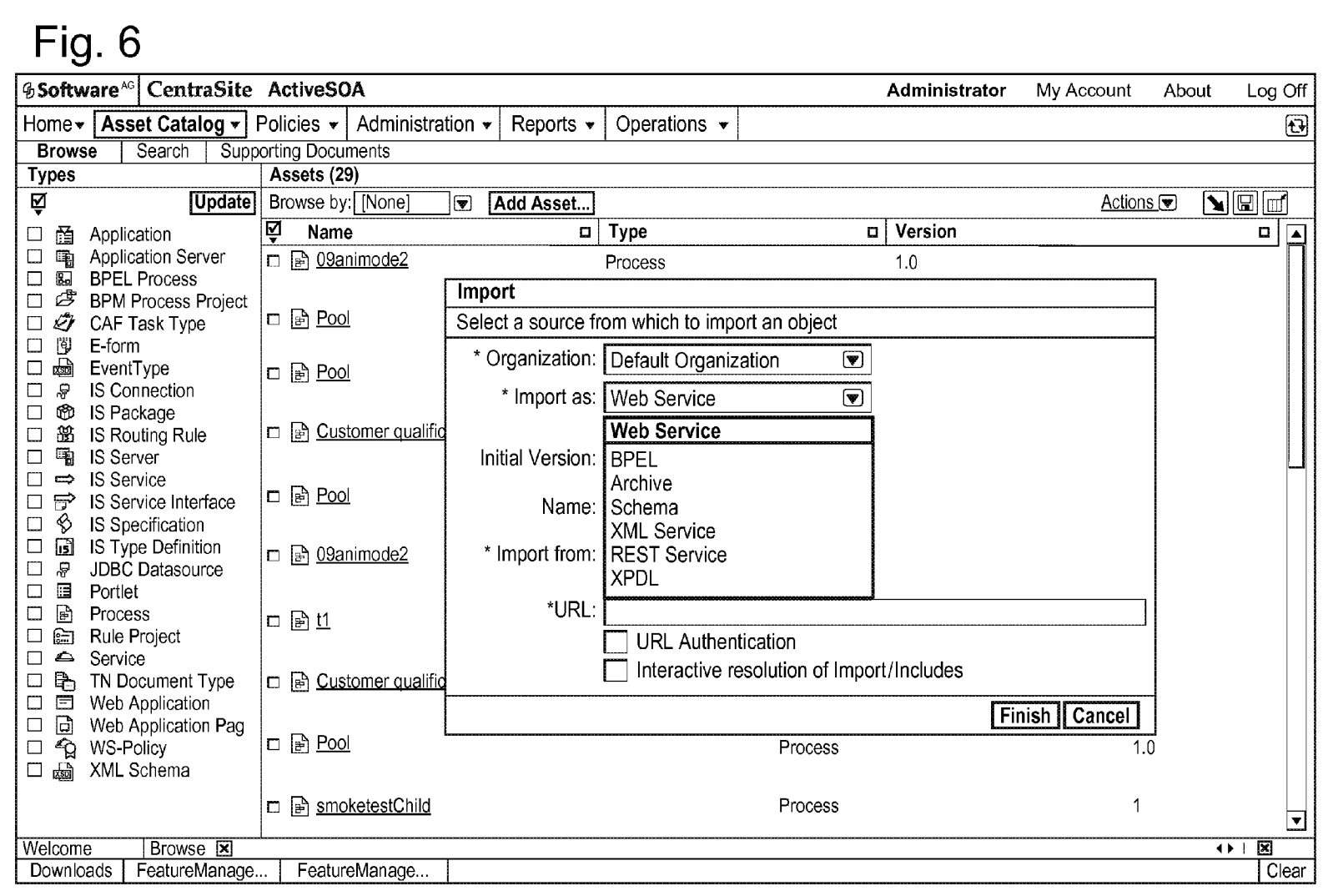

As shown in FIG. 6, a user may import a source asset as a web service, Business Process Execution Language (BPEL) document, archive, schema, XML service, Representational State Transfer (REST) service, XML Process Definition Language (XPDL) document, etc. It will be appreciated that some or all of these and/or other asset types may be provided in connection with different example embodiments. Specifying a new import functionality as described above (e.g., introducing a new tag characterizing the import functionality) would lead to another entry in the corresponding drop-down list. The FIG. 6 example screenshot also indicates that a user may specify the organization for which the asset (reg.) is to be registered, an initial version of the asset (reg.), a name for the asset (reg.), a physical location or URL of the asset (reg.), etc. Authentication (e.g., URL authentication) and/or interactive resolution of import/includes may be specified in certain example embodiments. When the interactive resolution of import/includes checkbox is not checked, dependent files will be found by a predefined algorithm (or not at all). However, when the interactive resolution of import/includes checkbox is checked, a dialog or other user interface element may be shown to enable the user to specify the location of such files. Example asset types (reg.) are listed in FIG. 6, as are already imported assets (reg.) (which have associated types and version numbers). It will be appreciated that the example asset types (reg.), assets (reg.), and linkages shown in the background of FIG. 6 are illustrative and these and/or other assets (reg.), asset types (reg.), etc., may be provided in different example embodiments.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor execute instructions that may be tangibly stored on a computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computer system, comprising:
   processing resources including at least one processor and at least one memory;
   at least one non-transitory computer readable storage medium accessible by the processing resources and including:
     a repository configured to store a plurality of real assets, and
     a registry configured to store metadata and/or other information about said real assets and including at least one registry asset per real asset, each registry asset having a registry asset type; and
   a generic import module configured to (a) receive as input one or more import specifications, each said import specification defining how information from an external specification file including and/or describing one or more real assets is to be extracted to create one or more registry assets of one or more corresponding target registry asset types, (b) generate one or more registry assets of one or more target registry asset types based on a corresponding import specification, and (c) register, in the registry, the generated one or more registry assets of the one or more target registry asset types.

2. The system of claim 1, wherein each said import specification is modeled as a registry asset that is stored in the registry.

3. The system of claim 2, wherein each said import specification is classified with a tag or category, each tag or category representing a distinct import functionality.

4. The system of claim 2, an export module configured to export registry assets together with the assets' corresponding import specification(s) and with the corresponding files from the repository.

5. The system of claim 1, wherein each said import specification includes an indication of a source for each attribute of the corresponding target registry asset type(s).

6. The system of claim 5, wherein the import specification indicates, for attributes of a first registry asset that express a relation to another registry asset of the same or a different registry asset type, a technique regarding how to compute the another registry asset's identification, and/or attribute(s) of the relation.

7. The system of claim 5, wherein the import specification indicates, for attributes of the first registry asset that represent files in a repository associated with the registry, a technique regarding how to compute a path to the file and/or a location where the file is to be stored in the repository.

8. The system of claim 5, wherein the import specification indicates, for attributes of the first registry asset that represent a classification with a given taxonomy, a technique regarding how to compute the taxonomy and the corresponding category.

9. The system of claim 5, wherein the import specification indicates values for attributes.

10. The system of claim 1, wherein the generic import module is further configured to apply an extraction routine to an external specification file to derive attribute(s) of the corresponding target asset type(s).

11. The system of claim 10, wherein the extraction routine includes providing a constant as an attribute value.

12. The system of claim 10, wherein the extraction routine includes applying an XPath expression.

13. The system of claim 10, wherein the extraction routine includes applying an XQuery expression.

14. The system of claim 1, further comprising a policy administration module configured to control for the correctness of the import specifications by applying one or more rules to the import specifications, and/or actual or projected output thereof.

15. A method of importing registry assets having one or more source registry asset types together with relevant documents into a service-oriented architecture (SOA) registry and/or repository, the SOA repository and the SOA registry being stored in a non-transitory computer readable storage medium of an SOA computer system comprising at least one computer having at least one processor in operable communication with the SOA repository and the SOA registry, the method comprising:
   invoking, via the at least one processor, a generic import module in response to input identifying an import functionality and the target SOA registry, and either (a) input specifying one or more external specification files describing the one or more assets to be registered, or (b) an automatic derivation of the one or more external specification files describing the one or more assets to be registered based on a relationship between the one or more external specification files and the identified import functionality;
   retrieving one or more import specifications;
   running an extraction algorithm specified by the one or more retrieved import specifications on the one or more assets to be registered to create one or more target registry assets having one or more target registry asset types; and
   storing or registering the one or more target registry assets having one or more target registry asset types in the SOA registry.

16. The method of claim 15, wherein each said import specification is modeled as a registry asset that is stored in the registry.

17. The method of claim 16, wherein each said import specification is classified with a tag or category, each tag or category representing a distinct import functionality.

18. The method of claim 15, wherein each said import specification includes an indication of a source for each attribute of the corresponding target registry asset type(s).

19. The method of claim 18, wherein the import specification indicates:
- for attributes of a first registry asset that express a relation to another registry asset of the same or a different registry asset type, the another registry asset's identification, and/or attribute(s) of the relation;
- for attributes that represent files in a repository associated with the registry, a path to the file and/or a location where the file is to be stored in the repository;
- for attributes that represent a classification with a given taxonomy, the taxonomy and the corresponding category; and
- for all other attributes, the import specification indicates values.

20. The method of claim 15, wherein the extraction routine includes: providing a constant as an attribute value, XPath expression, and/or an XQuery expression.

21. The method of claim 15, wherein said registering includes registering multiple registry assets of multiple target registry asset types.

22. The method of claim 21, further comprising registering a list of all registry assets created at one time.

23. The method of claim 21, further comprising restricting read access to import specifications or to specific assets corresponding to import specifications so as to restrict import functionality to certain users.

24. The method of claim 21, further comprising restricting write access to import specifications or to specific assets corresponding to import specifications so as to limit the right to define new import functionalities or modify existing import functionalities.

25. A non-transitory computer readable storage medium tangibly storing instructions that, when executed by at least one processor in a service-oriented architecture (SOA) environment, perform the method of claim 15.

* * * * *